(12) United States Patent
Kurihara (10) Patent No.: US 8,933,849 B2
(45) Date of Patent: Jan. 13, 2015

(54) PORTABLE WIRELESS DEVICE

(75) Inventor: Kazuhiro Kurihara, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 162 days.

(21) Appl. No.: 13/637,832

(22) PCT Filed: Mar. 28, 2011

(86) PCT No.: PCT/JP2011/057522
§ 371 (c)(1),
(2), (4) Date: Sep. 27, 2012

(87) PCT Pub. No.: WO2011/125569
PCT Pub. Date: Oct. 13, 2011

(65) Prior Publication Data
US 2013/0009829 A1    Jan. 10, 2013

(30) Foreign Application Priority Data
Mar. 31, 2010    (JP) ................. P2010-082097

(51) Int. Cl.
*H01Q 1/24* (2006.01)
*H01Q 1/38* (2006.01)
*H01Q 9/42* (2006.01)
*H04M 1/02* (2006.01)

(52) U.S. Cl.
CPC ............... *H01Q 1/243* (2013.01); *H01Q 1/38* (2013.01); *H01Q 9/42* (2013.01); *H04M 1/0235* (2013.01)
USPC ....................................... 343/702; 455/575.4

(58) Field of Classification Search
CPC ........... H01Q 1/243; H01Q 1/38; H01Q 9/42; H04M 1/235
USPC .................................. 343/702; 455/90, 575.4
See application file for complete search history.

(56) References Cited

U.S. PATENT DOCUMENTS 7,289,072 B2 * 10/2007 Sakurai .................... 343/702
7,589,673 B2 * 9/2009 Kuramoto ............. 343/700 MS
(Continued)

FOREIGN PATENT DOCUMENTS

CN        1716790 A    1/2006
JP     2006-148669 A    6/2006
(Continued)

OTHER PUBLICATIONS

Chinese First Office Action dated Jan. 17, 2014 received from the Chinese Patent Office in related case application No. 201180013949.X.

(Continued)

*Primary Examiner* — Tho G Phan
(74) *Attorney, Agent, or Firm* — Scully, Scott, Murphy & Presser, P.C.

(57) ABSTRACT

A slide type portable wireless device includes: a first housing; a second housing which slides relative to the first housing, and is positioned at either of a first relative position and a second relative position different from the first relative position; an antenna element which is embedded in the first housing; and a plurality of parasitic elements which are provided in the second housing, and includes first and second parasitic elements capacity coupled with the antenna element. The first parasitic element faces the antenna element at the first relative position. The second parasitic element faces the antenna element at the second relative position.

4 Claims, 5 Drawing Sheets

(56) References Cited

U.S. PATENT DOCUMENTS

| | | | |
|---|---|---|---|
| 8,306,584 B2 * | 11/2012 | Yeh et al. | 455/575.4 |
| 2005/0275596 A1 | 12/2005 | Harano | |
| 2009/0305755 A1 | 12/2009 | Lee et al. | |
| 2011/0136554 A1 * | 6/2011 | Wong et al. | 455/575.4 |

FOREIGN PATENT DOCUMENTS

| | | |
|---|---|---|
| JP | 2006-197292 A | 7/2006 |
| JP | 2006-238176 A | 9/2006 |
| JP | 2007-104520 A | 4/2007 |
| JP | 4413145 B2 | 2/2010 |
| WO | 2009/051211 A1 | 4/2009 |

OTHER PUBLICATIONS

International Search Report and Written Opinion dated Jul. 5, 2011 issued in PCT/JP2011/057522.

* cited by examiner

PORTABLE WIRELESS DEVICE

TECHNICAL FIELD

The present invention relates to a portable wireless device such as a portable phone having a slide type structure in which an antenna is mounted.

BACKGROUND ART

Antennas have recently been designed in consideration of design of portable wireless devices. For this reason, antennas have been designed to be built-in. Further, progress has been made in reducing the sizes of the portable wireless devices, and thus sizes of the built-in antennas are also required to be reduced. Furthermore, such portable wireless devices are mounted with devices having various functions to meet user needs. For this reason, space for the built-in antenna tends to be increasingly reduced.

In such situations, slide type portable wireless phones, the housing of which is changed in length when opened/closed, have been provided, such as those disclosed in Patent Documents 1 and 2.

A slide type portable phone device disclosed in Patent Document 1 includes a built-in antenna in a lower housing for performing reception. Further, this portable phone device includes a parasitic element, in which one end thereof is grounded, on an upper ground plane in an upper housing that is provided to freely slide relative to the lower housing. This portable phone device is configured to resonate the parasitic element with the built-in antenna at a position at which the parasitic element and the built-in antenna are opposite and adjacent to each other, and to improve radiation power efficiency.

Further, a portable communication device disclosed in Patent Document 2 is provided with a parasitic element (resonant element), which is adjacent to an antenna element (driven element), at an antenna holder in a housing. This portable communication device is configured to switch connection and disconnection between the parasitic element and a substrate ground (ground conductor) to control polarization, and to seek to improve gains during data communication and during call service.

PRIOR ART DOCUMENTS

Patent Documents

[Patent Document 1] Japanese Unexamined Patent Application, First Publication No. 2006-148669
[Patent Document 2] Japanese Unexamined Patent Application, First Publication No. 2007-104520

SUMMARY OF THE INVENTION

Problem to be Solved by the Invention

In the portable wireless device having the built-in antenna as described above, overall miniaturization is under way. For this reason, the built-in antenna cannot secure sufficient space to secure an antenna characteristic, and the antenna characteristic tends to be degraded. Furthermore, in the slide type portable wireless device in which the antenna corresponding to a plurality of frequency bands is mounted, the antenna characteristic is changed by the change of the relative position between the housings, and the receiving sensitivity is degraded at the different frequency bands.

One exemplary object of the present invention is to provide a slide type portable wireless device having a built-in multi-band compatible antenna that improves degradation of receiving sensitivity caused by a change in relative position between housings, and that produces a good receiving sensitivity characteristic.

Means for Solving the Problem

To solve these problems, a slide type portable wireless device of the present invention includes: a first housing; a second housing which slides relative to the first housing, and is positioned at either of a first relative position and a second relative position different from the first relative position; an antenna element which is embedded in the first housing; and a plurality of parasitic elements which are provided in the second housing, and includes first and second parasitic elements capacity coupled with the antenna element. The first parasitic element faces the antenna element at the first relative position. The second parasitic element faces the antenna element at the second relative position.

Effect of the Invention

According to the present invention, each parasitic element is adjusted to the frequency band at which the receiving sensitivity is desired to be improved. Thereby, in response to the change of the relative position between the housings such as the opened state in which the second housing is slide-moved relative to the first housing and the closed state in which the second housing is not slide-moved relative to the first housing, the receiving sensitivity of each of the different frequency bands can be improved.

As a result, the portable wireless device in which a multi-band compatible antenna corresponding to a plurality of frequency bands is mounted can realize good wireless communication regardless of the change of the relative position between the housings.

Further, according to the present invention, a plurality of parasitic elements including first and second parasitic elements are provided in the second housing, and are each capacity coupled with the antenna element. The first parasitic element faces the antenna element at a first relative position, whereas the second parasitic element faces the antenna element at a second relative position. Due to this simple configuration, the receiving sensitivity of different frequency bands can be improved. That is, the receiving sensitivity can be improved without increasing the size of the entire portable wireless device.

EMBODIMENTS FOR CARRYING OUT THE INVENTION

A portable wireless device having a slide type structure according to an exemplary embodiment of the present invention will be described with reference to FIGS. 1A to 3B. The portable wireless device of the present exemplary embodiment is applied to a portable phone that performs wireless mobile communication.

Figure 1A:
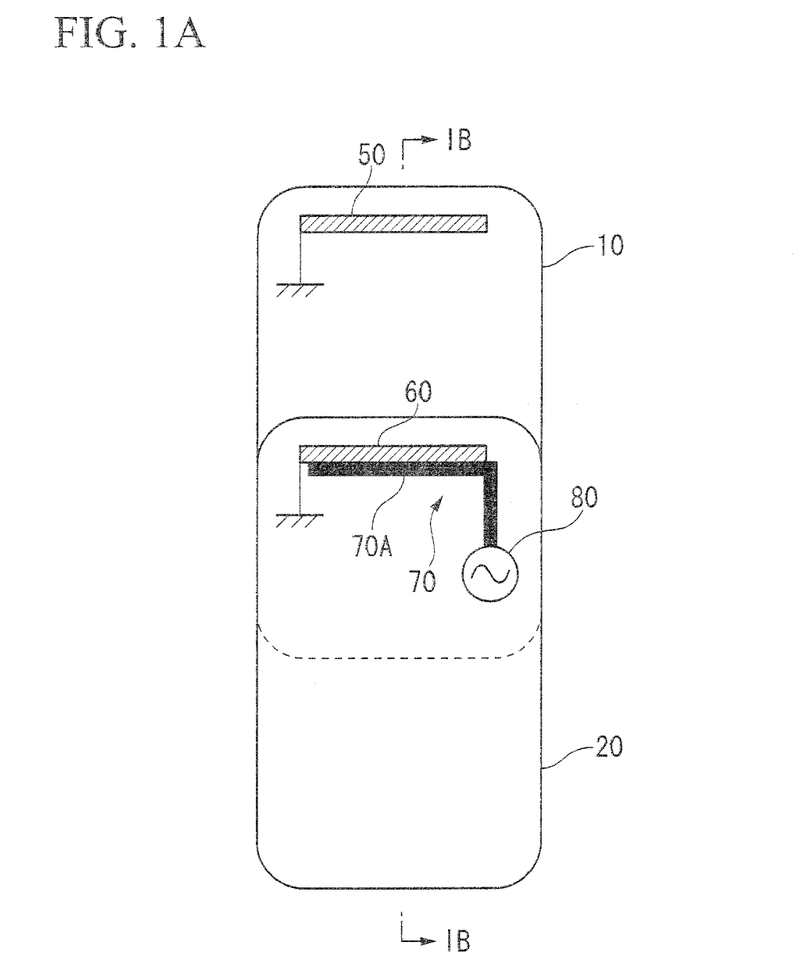
FIG. 1A shows a state in which a slide type portable wireless device according to an exemplary embodiment of the present invention slides to be opened (opened position), and an explanatory view for the portable wireless device when viewed from the rear side.
Figure 1B:
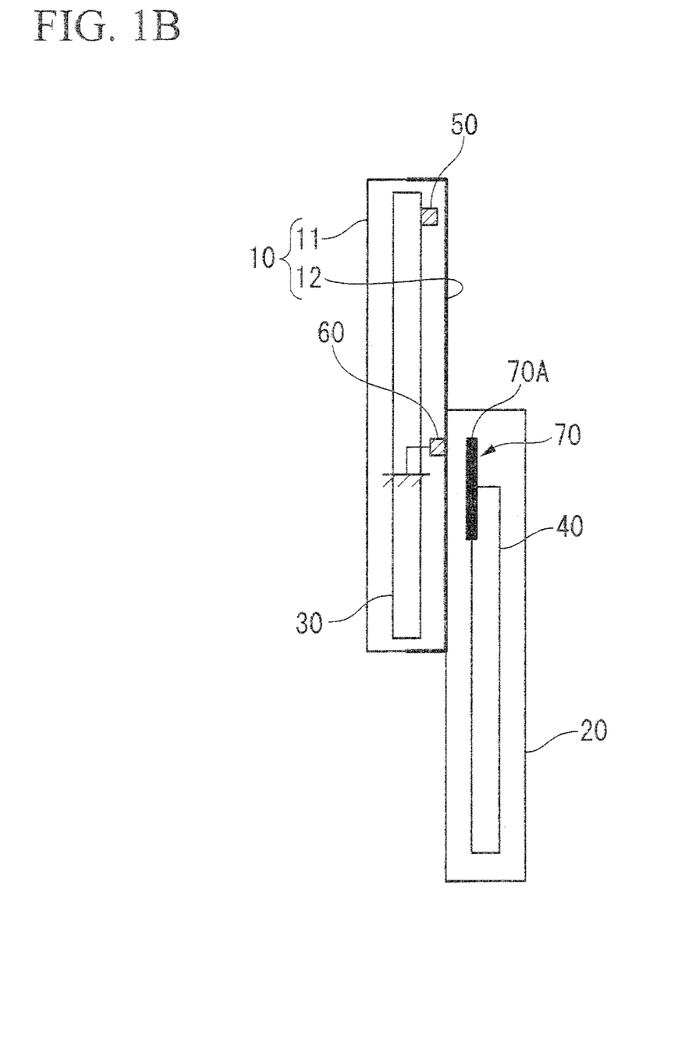
FIG. 1B shows the state in which the slide type portable wireless device according to the exemplary embodiment of the present invention slides to be opened (opened position), and is a cross-sectional view taken along line IB-IB of FIG. 1A.
Figure 2A:
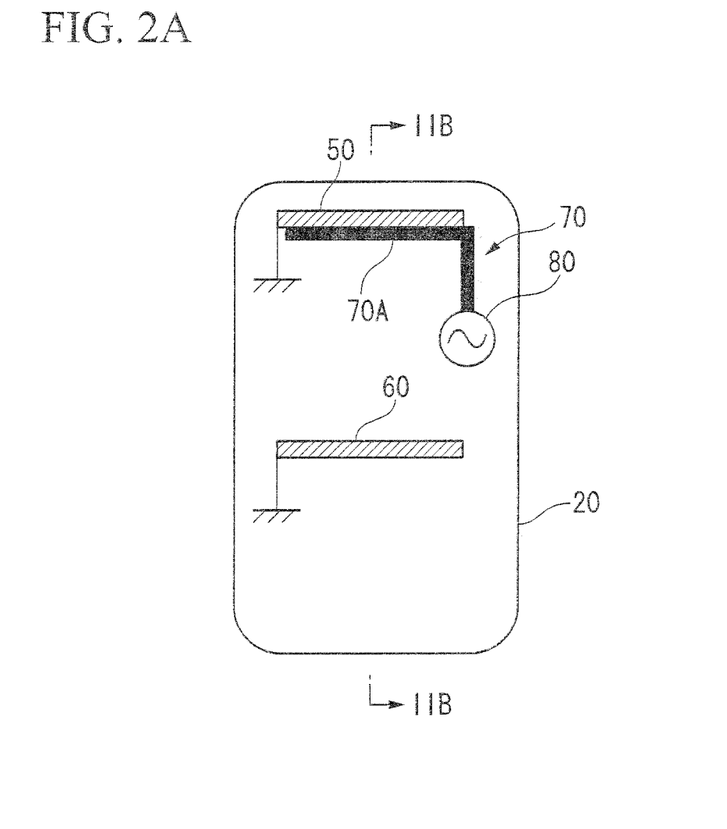
FIG. 2A shows a state in which the slide type portable wireless device according to the exemplary embodiment of the present invention slides to be closed (closed position), and is an explanatory view for the portable wireless device when viewed from the rear side.
Figure 2B:
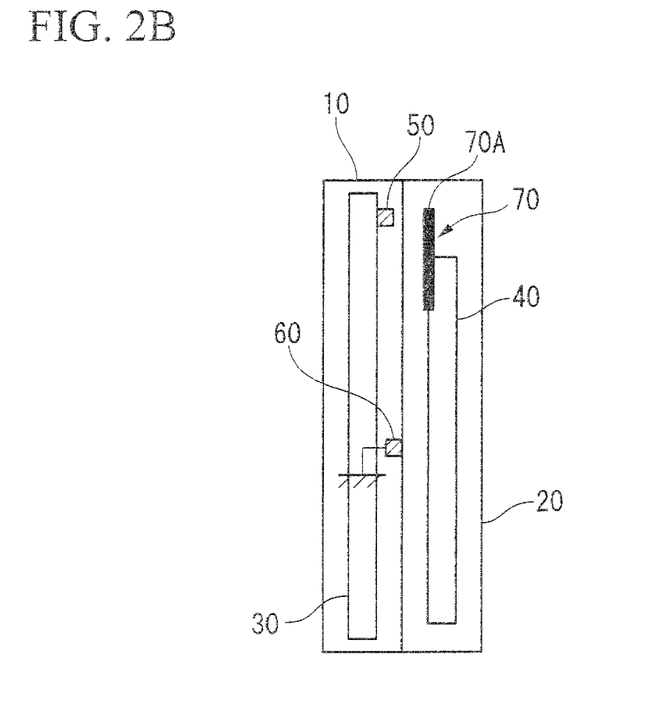
FIG. 2B shows the state in which the slide type portable wireless device according to the exemplary embodiment of the present invention slides to be closed (closed position), and is a cross-sectional view taken along line IIB-IIB of FIG. 2A.
Figure 3A:
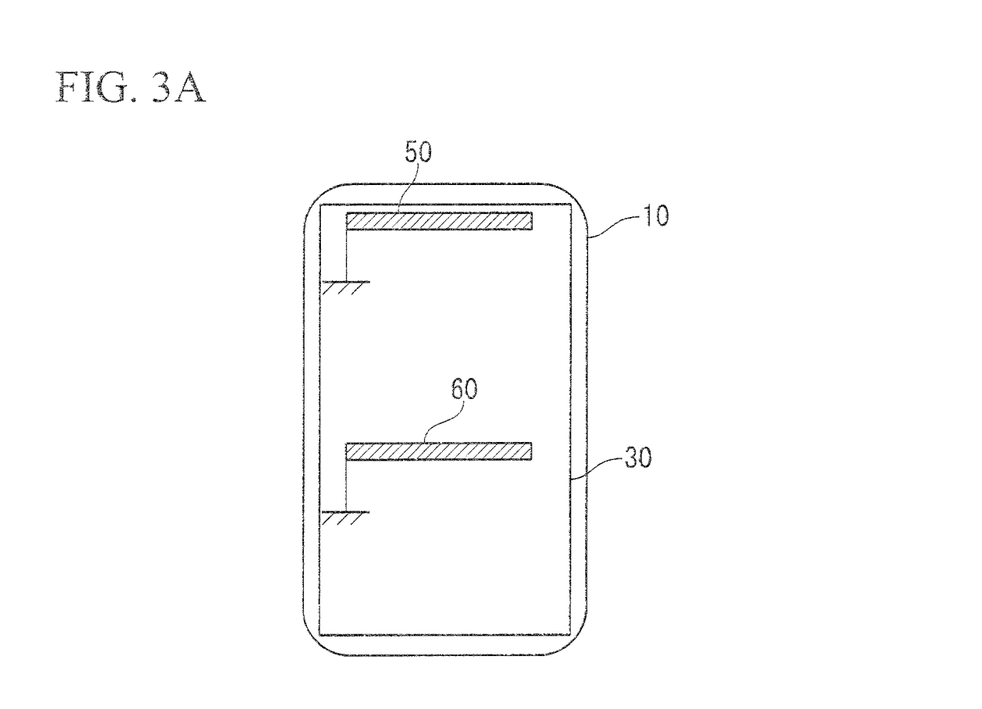
FIG. 3A is an explanatory view for the upper housing shown in FIGS. 1A to 2B when viewed from the rear side.
Figure 3B:
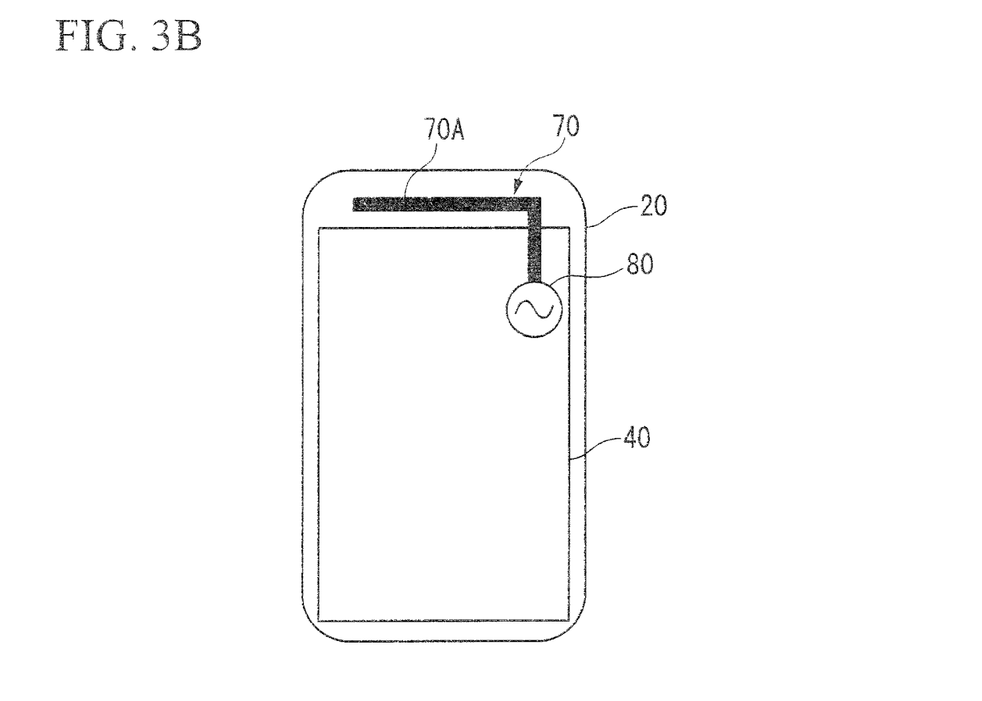
FIG. 3B is an explanatory view for the lower housing shown in FIGS. 1A to 2B when viewed from the rear side.

FIGS. 1A and 1B show a state in which the portable wireless device slides to be opened (opened position). FIG. 1A is an explanatory view for the portable wireless device when viewed from the rear side. FIG. 1B is a cross-sectional view taken along line IB-IB of FIG. 1A. FIGS. 2A and 2B show a state in which the slide type portable wireless device slides to be closed (closed position). FIG. 2A is an explanatory view for the portable wireless device when viewed from the rear side. FIG. 2B is a cross-sectional view taken along line IIB-IIB of FIG. 2A. FIG. 3A shows the upper housing shown in FIGS. 1A to 2B. FIG. 3B shows the lower housing shown in FIGS. 1A to 2B.

The housings of the slide type portable wireless device shown in FIGS. 1A to 3B are configured so that an upper housing 10 (second housing) is coupled to a lower housing 20 (first housing) to freely slide relative to the lower housing 20. A lower board 40 is provided in the lower housing 20. An upper board 30 is provided in the upper housing 10.

As shown in FIG. 1B, the upper housing 10 is configured so that a front cover 11 located on a front side thereof is joined with a rear cover 12 that is located on a rear side thereof and slides relative to the lower housing 20.

Signals from operation keys and microphone (not shown) installed on the lower board 40 are input to the lower housing 20. A transmission and reception circuit 80 is mounted on the lower board 40 for wireless communication based on the signals. The lower board 40 is provided with a built-in antenna 70 at an upper end thereof which has an antenna element 70A corresponding to a plurality of frequency bands. The antenna element 70A of the built-in antenna 70 is arranged so that an element main body thereof is located at an upper portion of the lower housing 20 and disposed to be in line with a widthwise direction of the lower housing 20.

The upper board 30 transmits signals to a display unit and a speaker (not shown) installed on the upper housing 10. The upper board 30 has a first parasitic element 50 and a second parasitic element 60 that are capacity coupled with the antenna element 70A of the built-in antenna 70. These parasitic elements 50 and 60 are provided to face the antenna element 70A at positions that are different in relative position between the lower housing 20 and the upper housing 10. In detail, the parasitic elements 50 and 60 are arranged apart from each other in line with a sliding direction of the upper housing 10. Furthermore, the parasitic elements 50 and 60 are disposed to be in line with a widthwise direction of the upper housing 10.

That is, the antenna element 70A and the parasitic elements 50 and 60 are configured as follows. The antenna element 70A is disposed at one end side (upper side in the present exemplary embodiment) of the lower housing 20 always overlapping with the upper housing 10 regardless of the relative position between the lower housing 20 and the upper housing 10. One (parasitic element 60) of the parasitic elements 50 and 60 is disposed at the other end (second end) side (lower side in the present exemplary embodiment) of the upper housing 10 always overlapping with the lower housing 20 regardless of the relative position. The other (parasitic element 50) of the parasitic elements 50 and 60 is disposed at one end side (upper side in the present exemplary embodiment) that does not overlap with the lower housing 20 due to the relative position between the lower housing 20 and the upper housing 10.

In other words, the antenna element 70A is disposed at one end side of the lower housing 20 always overlapping with the upper housing 10 at either of the closed position (first relative position) and the opened position (second relative position). The first parasitic element 50 is disposed at one end side of the upper housing 10 that does not overlap with the lower housing 20 at the opened position (i.e., the first parasitic element 50 is disposed at one end side of the upper housing 10 which is the opposite side of the second end side of the upper housing 10). The second parasitic element 60 is disposed at the second end side of the upper housing 10 always overlapping with the lower housing 20 at either of the closed position (first relative position) and the opened position (second relative position).

The upper and lower boards 30 and 40 are connected with a signal line and a ground respectively by a flexible board that is not shown.

The first parasitic element 50 is configured by a stripline at an upper portion of the upper board 30 in the upper housing 10. As shown in FIGS. 2A and 2B, the first parasitic element 50 is disposed at a position that is parallel and opposite to the antenna element 70A of the lower housing 20 side in a closed state in which the housings 10 and 20 are closed, and is configured to be capacity coupled with the antenna element 70A. One end of the first parasitic element 50 is connected to a ground of the upper board 30. The other end of the first parasitic element 50 serves as an open end. In FIG. 2A, for convenience of description, the antenna element 70A is shown displaced downwardly with respect to the first parasitic element 50.

The second parasitic element 60 is configured by a flexible board and is installed inside the rear cover 12. One end of the second parasitic element 60 is connected to the ground of the upper board 30 in the upper housing 10 by a spring or a pin. The other end of the second parasitic element 60 serves as an open end. The second parasitic element 60 is provided at a middle portion of the upper housing 10. As shown in FIGS. 1A and 1B, the second parasitic element 60 is disposed at a position that is parallel and opposite to the antenna element 70A of the lower housing 20 side in an open state in which the housings 10 and 20 are opened and is configured to be capacity coupled with the antenna element 70A. In FIG. 1A, for convenience of description, the antenna element 70A is shown displaced downwardly with respect to the second parasitic element 60.

The first and second parasitic elements 50 and 60 are adjusted in length, thereby making it possible to improve receiving sensitivity on respective desired frequency bands.

The expression the upper housing 10 is located at an "opened position" with respect to the lower housing 20 refers to a state in which the upper housing 10 is located at the extremity of a sliding range with respect to the lower housing 20 and is completely opened, as shown in FIGS. 1A and 1B. The positions of the antenna element 70A and the second parasitic element 60 are set so that in this state the antenna element 70A inside the lower housing 20 has a relative positional relationship of facing the second parasitic element 60.

The expression the upper housing 10 is located at a "closed position" with respect to the lower housing 20 refers to a state in which the upper housing 10 fully overlaps with the lower housing 20, as shown in FIGS. 2A and 2B. The positions of the antenna element 70A and the first parasitic element 50 are set so that in this state the antenna element 70A inside the lower housing 20 has a relative positional relationship of facing the first parasitic element 50.

In the slide type portable wireless device configured as described above, as shown in FIGS. 1A and 1B, the upper housing 10 slides relative to the lower housing 20, and thereby the housings 10 and 20 of the portable wireless device are opened. In this case, the element 70A of the built-in antenna 70 disposed at the upper portion of the lower housing 20 is disposed in the positional relationship of facing the second parasitic element 60 located at the middle portion of the upper housing 10. Thereby, the element 70A of the built-in antenna 70 is capacity coupled with the second parasitic element 60, so that a receiving sensitivity characteristic of the antenna can be improved.

On the other hand, as shown in FIGS. 2A and 2B, the upper housing 10 slides relative to the lower housing 20, and thereby the housings 10 and 20 of the portable wireless device are closed. In this case, the element 70A of the built-in antenna 70 disposed at the upper portion of the lower housing 20 is disposed in the positional relationship of facing the first parasitic element 50 located at the upper end in the upper housing 10. Thereby, the element 70A of the built-in antenna 70 is capacity coupled with the first parasitic element 50, so that a receiving sensitivity characteristic of the antenna can be improved.

As described above, according to the slide type portable wireless device shown in the present exemplary embodiment, the antenna element 70A is mounted in the lower housing 20, and the plurality of parasitic elements 50 and 60, each of which can be capacity coupled with the antenna element 70A, are formed on the upper housing 10 side so as to face the antenna element 70A at positions at which the relative positions of the lower housing 20 and the upper housing 10 are different from each other. With this configuration, each of the parasitic elements 50 and 60 is adjusted to the frequency band at which the receiving sensitivity is desired to be improved. Thereby, in response to the change of the relative position between the housings 10 and 20 such as the opened state in which the upper housing 10 slides relative to the lower housing 20 and the closed state in which the upper housing 10 slides relative to the lower housing 20, the receiving sensitivity of the different frequency bands can be improved. As a result, the portable wireless device in which a multi-band compatible antenna corresponding to a plurality of frequency bands is mounted can realize good wireless communication regardless of the change of the relative position between the housings 10 and 20.

Further, according to the present exemplary embodiment, the plurality of parasitic elements 50 and 60, each of which can be capacity coupled with the antenna element 70A, are provided on the upper housing 10 side so as to face the antenna element 70A at positions at which the relative positions of the lower housing 20 and the upper housing 10 are different from each other. Due to this simple configuration, the receiving sensitivity of the different frequency bands can be improved. That is, the receiving sensitivity can be improved without increasing the size of the entire portable wireless device.

In the aforementioned exemplary embodiment, a pair of parasitic elements 50 and 60, each of which can be capacity coupled with the antenna element 70A, are arranged in the upper housing 10 rather than the lower housing 20 in which the antenna element 70A is mounted so as to be in line with the sliding direction of the housings 10 and 20. However, the parasitic elements 50 and 60 are not limited to one pair. The parasitic elements 50 and 60 may be additionally disposed depending on a sliding position of the housings 10 and 20 and a communication situation.

In the aforementioned exemplary embodiment, the upper and lower housings 10 and 20 slide linearly, but are not limited to this motion. The upper housing 10 and lower housing 20 may slidably rotate about a predetermined rotational axis. Even in this case, when relative rotational positions of the upper housing 10 and the lower housing 20 are different from each other, different parasitic elements are disposed to face the antenna element. Thereby, the similar effect is produced.

While the exemplary embodiment of the present invention has been described in detail with reference to the drawings, the specific configuration is not limited to this exemplary embodiment, and the present invention includes design modifications without departing from the scope of the present invention.

This application is based upon and claims the benefit of priority from Japanese patent application No. 2010-082097 filed on Mar. 31, 2010, the disclosure of which is incorporated herein in its entirety by reference.

INDUSTRIAL APPLICABILITY

The present invention can be applied to a portable wireless device. According to this portable wireless device, the degradation of the receiving sensitivity caused by the change of the relative position between the housings can be improved, and a good receiving sensitivity characteristic can be produced.

DESCRIPTION OF REFERENCE SYMBOLS

10 Upper housing (second housing)
11 Front cover
13 Rear cover
20 Lower housing (first housing)
30 Upper board
40 Lower board
50 First parasitic element
60 Second parasitic element
70 Built-in antenna
70A Element of built-in antenna

The invention claimed is:
1. A slide type portable wireless device comprising:
a first housing;
a second housing which slides relative to the first housing, and is positioned at either of a first relative position and a second relative position different from the first relative position;
an antenna element which is embedded in the first housing; and
a plurality of parasitic elements which are provided in the second housing, and includes first and second parasitic elements capacity coupled with the antenna element, the first parasitic element facing the antenna element at the first relative position at which the second housing is located at a closed position with respect to the first housing,
wherein the first parasitic element is configured by a stripline on an upper board in the second housing; and
the second parasitic element facing the antenna element at the second relative position at which the second housing is located at an opened position with respect to the first housing, and wherein the second parasitic element is configured by a flexible board, and is installed inside a rear cover being a rear side of the second housing, and one end of the second parasitic element is grounded on a ground of the upper board in the second housing.

2. The slide type portable wireless device according to claim 1, wherein:
   the antenna element is disposed at one end side of the first housing always overlapping with the second housing at both of the first relative position and the second relative position;
   the first parasitic element is disposed at one end side of the second housing that does not overlap with the first housing at the second relative position; and
   the second parasitic element is disposed at a second end side of the second housing always overlapping with the first housing at both of the first relative position and the second relative position.

3. The slide type portable wireless device according to claim 1, wherein the antenna element is a built-in antenna located in the first housing, and is a multi-band type antenna corresponding to a plurality of frequency bands.

4. The slide type portable wireless device according to claim 1, wherein the plurality of parasitic elements adjust a frequency band in which receiving sensitivity is improved, to another frequency band in accordance with an opened/closed state of the second housing.

\* \* \* \* \*